Sept. 25, 1956 F. R. MORTIMER 2,764,264
AUTOMATIC BRAKING APPARATUS FOR AIRCRAFT WHEELS
Filed Feb. 19, 1954
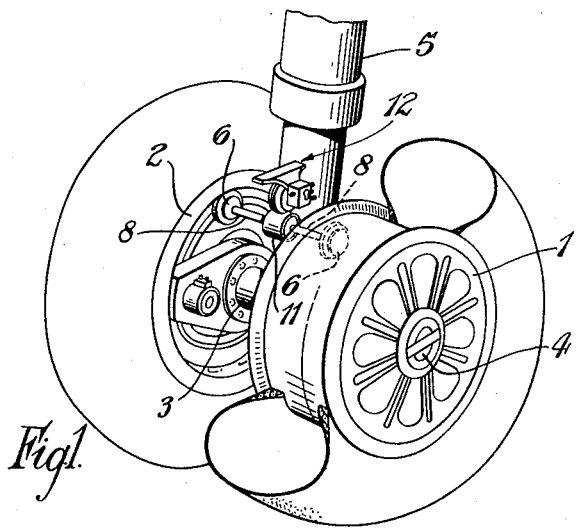
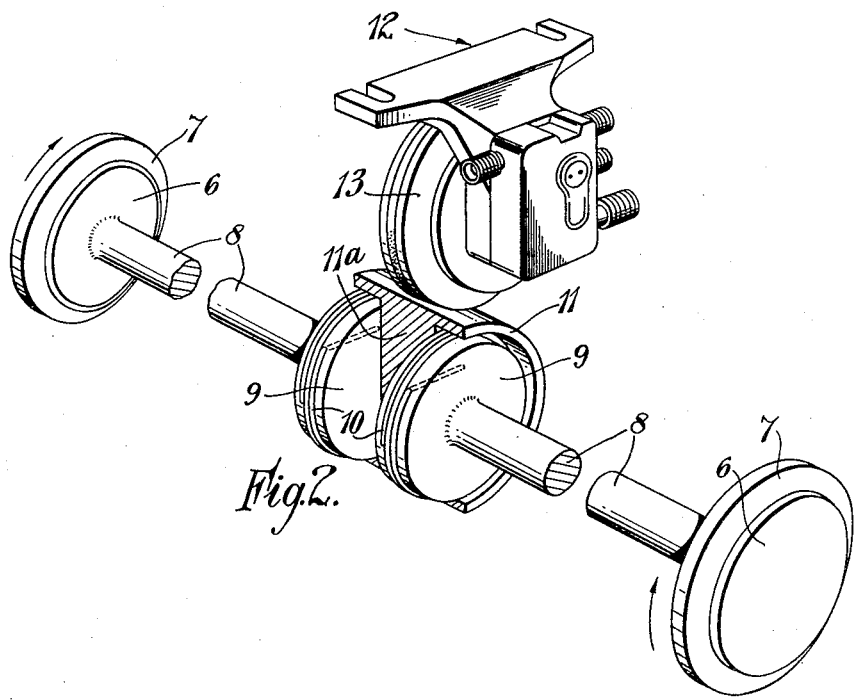
INVENTOR
Frank Radcliffe Mortimer
by Benj. T. Rauber
his attorney United States Patent Office 2,764,264
Patented Sept. 25, 1956

2,764,264

AUTOMATIC BRAKING APPARATUS FOR AIRCRAFT WHEELS

Frank Radcliffe Mortimer, Stivichale, England, assignor to Dunlop Rubber Company Limited, London County, England, a British company Application February 19, 1954, Serial No. 411,528

Claims priority, application Great Britain February 28, 1953

8 Claims. (Cl. 188—181)

This invention relates to automatic braking apparatus for the landing wheels of aircraft, and more particularly relates to means for driving such apparatus from a pair of landing wheels associated with a strut, as, for example, in a twin-wheel or bogie-type undercarriage.

Automatic braking apparatus for aircraft landing wheels are known comprising a rotary inertia mechanism rotatably driven by a wheel and means associated with said mechanism for automatically controlling the braking pressure to the wheel brakes, thereby to prevent sliding or skidding of said wheel. Such an apparatus is described and claimed for example, in Patent No. 2,656,017.

It is undesirable, in multi-wheel undercarriages, e. g. of the twin-wheel or four-wheel bogie types, to provide an automatic braking apparatus for each of said wheels. For one thing it is obviously uneconomical, and for another, if such apparatus is fitted to each wheel of a twin-wheel undercarriage, of the type comprising a wheel mounted on each side of one of the landing struts, and one wheel of the pair commences to skid or slide, due, e. g. to a patch of ice or oil on the runway, then the apparatus associated with said wheel will release or relieve the braking pressure to the brakes of said wheel, the other wheel remaining braked. The resulting couple might damage the strut assembly. In four wheel bogie undercarriages, on the other hand, the question of unbalance of this nature does not arise. However, when such a bogie lands the trailing pair of wheels usually contact the ground before the leading pair; thus it is not practicable to have one such apparatus controlling all four wheels but rather it is preferable for one such apparatus to control each pair of wheels of the bogie.

The object of the present invention is to provide an automatic braking apparatus for an aircraft multi-wheel undercarriage wherein means are provided whereby one such apparatus is driven by a pair of wheels and selectively controls the braking pressure to the brakes of said wheels.

According to the invention automatic braking apparatus for the axially aligned wheels of an aircraft multi-wheel undercarriage comprises means rotatable by said wheels at an angular velocity determined by the wheel having the lowest angular velocity and a rotary inertia mechanism driven by said means to automatically control the supply of pressure fluid to the brakes associated with said wheels.

Preferably the said means are driven by a pair of wheels spaced axially a short distance apart, e. g. one on each side of an undercarriage strut, and said means comprises a roller rotatably associated with each of said wheels, each roller driving a clutch plate having a spring wound helically around the outer periphery thereof. One end of each spring is secured to its clutch plate, the other end being free. The clutch-plates, with springs attached, are fitted one in each end of a cylinder. The clutch-plate springs provide a light torque in one direction, i. e. for forward movement of the aircraft, and a heavy torque in the opposite direction. When the wheels are rotating normally the light torque drives the cylinder which in turn drives a rotary inertia mechanism of known type to automatically and selectively control the supply of pressure fluid to the brakes of the two wheels. However, if one of the wheels decelerates relative to the other wheel, i. e. if it slides or skids, then the associated clutch plate will decelerate with the wheel and this will create a heavy torque at one end of the cylinder which overcomes the light torque at the other end of the cylinder to decelerate the cylinder at the same rate as the sliding or skidding wheel.

The rotary inertia mechanism which is rotatably associated with the cylinder to automatically and selectively control the flow of pressure fluid from a source to the wheel brakes is preferably of the type known as the "Maxaret" (registered trademark) and is described in Patent No. 2,656,017. However, it is not necessarily restricted to this particular type of mechanism and may comprise any suitable type of rotary inertia control mechanism.

The invention will now be described with reference to the accompanying drawings, of which Figure 1 is a partly exploded perspective view of an aircraft wheel assembly incorporating the automatic braking apparatus of the invention.

Figure 2 is a perspective view of the same automatic braking apparatus.

Each wheel 1, 2 of a twin wheel undercarriage strut assembly is independently rotatable on stub axles 3, 4 extending from each side of the undercarriage strut 5 at the bottom thereof. The two wheels are thus spaced a short distance apart.

Two rollers 6, 6 are provided, each having a rubber tyre 7 on the outer periphery thereof, and said rollers are positioned so that each tyre 7 frictionally and drivably engages with the inner periphery of the rim of one of the landing wheels 1, 2. Each roller 6 is associated with the adjacent side of opposite wheels 1, 2 and said rollers are axially aligned one with the other. Two shafts 8, 8, rotatable in bearings are secured to the bottom of said strut 5, each have one end secured centrally to one of said rollers 6 and extend axially away from the associated wheel. To the opposite end of each shaft 8 is secured a disc-like clutch plate 9 which is rotatable by said shaft. A spring 10 has one end secured to the outer periphery of each clutch plate 9, adjacent one edge thereof, and is wound helically around the outer periphery, the other end of the spring being free. The two clutch plates 9, 9 are spaced adjacent one another and are axially in line, and each clutch and spring assembly is fitted in opposite ends of a cylinder 11, which is provided with a diametrically-extending web 11a intermediate the ends thereof.

The outer diameter of each clutch-plate spring 10 is normally greater than the inside diameter of the cylinder 11, hence the spring has to be tensioned to a smaller diameter before it, together with the clutch-plate 9, can be positioned within the cylinder 11, and when inside the cylinder it expands to engage therewith. The lay of one spring, taken from the fixed end, is opposite to the direction of rotation of the associated roller for forward movement of the aircraft, i. e. if the roller 6 rotates in a clockwise direction for forward movement of the aircraft, then the spring 10 is wound in an anti-clockwise direction from its fixed end. The arrangement is such that on rotating the roller 6, shaft 8 and clutch-plate 9 in the opposite direction to the lay of the spring 10, a light torque only, due to the frictional engagement between the spring 10 and the cylinder 11 is obtained to drive the cylinder in the same direction, but if the direction of rotation of the roller 6, shaft 8 and clutch-plate 9 is reversed, then the frictional engagement between the spring 10 and cylinder 11 causes the spring to tend to unwind and jam against the cylinder, thus creating a heavy torque.

Rotatably associated with said cylinder 11 and located within a bracket (not shown) non-rotatably secured to the bottom of said strut 5 is a rotary inertia mechanism 12 to automatically control the operation of an incorporated valve mechanism which is connected to a source of fluid pressure and to the brakes of the twin wheels, whereby the braking pressure may be automatically controlled during the landing run. This mechanism, and its method of operation is more fully described in Patent No. 2,656,017.

The operation of the braking system will now be described. When the aircraft lands, the twin landing wheels 1, 2 both rotate at the same angular velocity, the rollers 6 rotate with the wheels, and drive their associated shafts 8 and clutch-plates 9. In this direction of rotation a comparatively light torque is obtained between the springs 10 of said clutch-plates 9 and the cylinder 11, and the cylinder is driven in the same direction and at the same speed as said plates. The rotating cylinder drives the rotatable housing 13 of the rotary inertia mechanism 12 associated therewith and this in turn operates the automatic braking apparatus to apply the brakes to both wheels.

If, during the landing run, and after the braking pressure has been applied, the degree of adhesion between the ground and one of the twin landing wheels 1, 2 is suddenly reduced, due, e. g. to a patch of ice or oil on the runway, then that wheel will commence to slide or skid, and will decelerate with respect to the other wheel. The roller 6, shaft 8 and clutch-plate 9 will decelerate with the wheel. The spring 10 associated with said clutch-plate will tend to unwind and jam against the cylinder 11 and a heavy torque will be created. This heavy torque tending to decelerate the cylinder 11 to the angular velocity of the sliding or skidding wheel will overcome the comparatively light torque on the other end in the cylinder exerted by the clutch-plate spring associated with the normally rotating wheel. The cylinder 11 will thus decelerate substantially at the same rate as the sliding or skidding wheel and the automatic braking apparatus will operate to reduce or relieve the braking pressure to both wheel brakes until the sliding or skidding condition of the one wheel is averted or rectified. The operation of the apparatus is fully described in Patent No. 2,656,017.

With the braking pressure relieved or reduced the wheels will rotate normally once more, and the cylinder 11 will be driven normally by the clutch plate springs 10, 10 in the manner described above to drive the housing 13 and operate the apparatus 12 to automatically restore braking pressure.

The braking pressure to twin wheels coupled together in this manner is thus determined by the wheel having the greater deceleration. This prevents differential braking of the two wheels with the resultant and undesirable couple at the bottom of the associated landing strut.

In a four-wheel landing bogie each pair of axially aligned wheels may drive a rotary inertia mechanism in the manner described, i. e. one mechanism driven by the trailing pair of wheels to control the brakes thereof, and one mechanism driven by the leading pair of wheels to control the brakes thereof.

Having described my invention, what I claim is:

1. Apparatus to control automatically the braking of a pair of axially aligned wheels provided with fluid pres-operated brakes comprising a rotatable cylinder located between said wheels, a pair of driving means each rotatable by one of said wheels, clutch mechanism associated one with each of said driving means to rotate the cylinder at a velocity determined by the wheel having the lowest angular velocity, and a rotary inertia mechanism driven by the cylinder to control automatically the supply of pressure fluid to the brakes associated with said wheels.

2. Actuating means according to claim 1 wherein said clutch mechanism comprises a helical spring wound around said member and engaging the inner periphery of said cylinder.

3. Actuating means according to claim 2 wherein said spring is wound to provide the greater driving torque to said cylinder when the wheels are rotating due to rearward movement of an associated vehicle.

4. Apparatus to control automatically the supply of brake fluid to fluid brakes of a pair of axially aligned wheels which comprises a rotatable cylinder, a pair of friction clutch mechanisms, one to be driven by one of said wheels and the other to be driven by the other of said wheels, each of said clutch mechanisms having an over riding engagement with said cylinder to engage said cylinder with greater friction in a direction corresponding with reverse rotation of its respective wheel than in a direction corresponding with forward direction and a rotary inertia mechanism driven by the cylinder to control automatically the supply of pressure fluid to the brakes.

5. The apparatus of claim 4 in which each clutch comprises a helical spring anchored to one element of said clutch and frictionally engaging the inner periphery of said cylinder.

6. A wheel and brake assembly which comprises a pair of axially aligned, independently rotatable, wheels, a fluid pressure brake for each wheel, a friction clutch mechanism comprising two driving elements, one driven by one of said wheels and the other driven by the other of said wheels and a driven element frictionally engaged by both of said driving elements with less friction in a direction corresponding to forward rotation of said wheels than in reverse direction and a rotary, inertia, fluid supply mechanism driven by the driven clutch element to control the supply of pressure fluid to said brakes.

7. The wheel and brake assembly of claim 6 in which the driving elements of said clutch have co-axial surfaces of rotation and said driven element has surfaces of rotation co-axial with and opposite the surfaces of rotation of said driving elements and in which said driven element is frictionally connected to said driving elements by a pair of springs, one between each driving element and said driven element, frictionally engaging the driving element with greater friction in one direction than in the other.

8. The wheel and brake assembly of claim 7 in which said springs are helical springs between said elements.

References Cited in the file of this patent

UNITED STATES PATENTS

| 2,038,145 | Cook et al. | Apr. 21, 1936 |
| 2,656,017 | Trevaskis | Oct. 20, 1953 |